Sept. 30, 1952     T. J. RHODES     2,612,040
APPARATUS FOR TESTING CORD FATIGUE Filed Dec. 11, 1947     3 Sheets-Sheet 1

INVENTOR.
THOMAS J. RHODES
BY
Charles C. Willson
ATTORNEY

Sept. 30, 1952  T. J. RHODES  2,612,040
APPARATUS FOR TESTING CORD FATIGUE
Filed Dec. 11, 1947  3 Sheets-Sheet 2
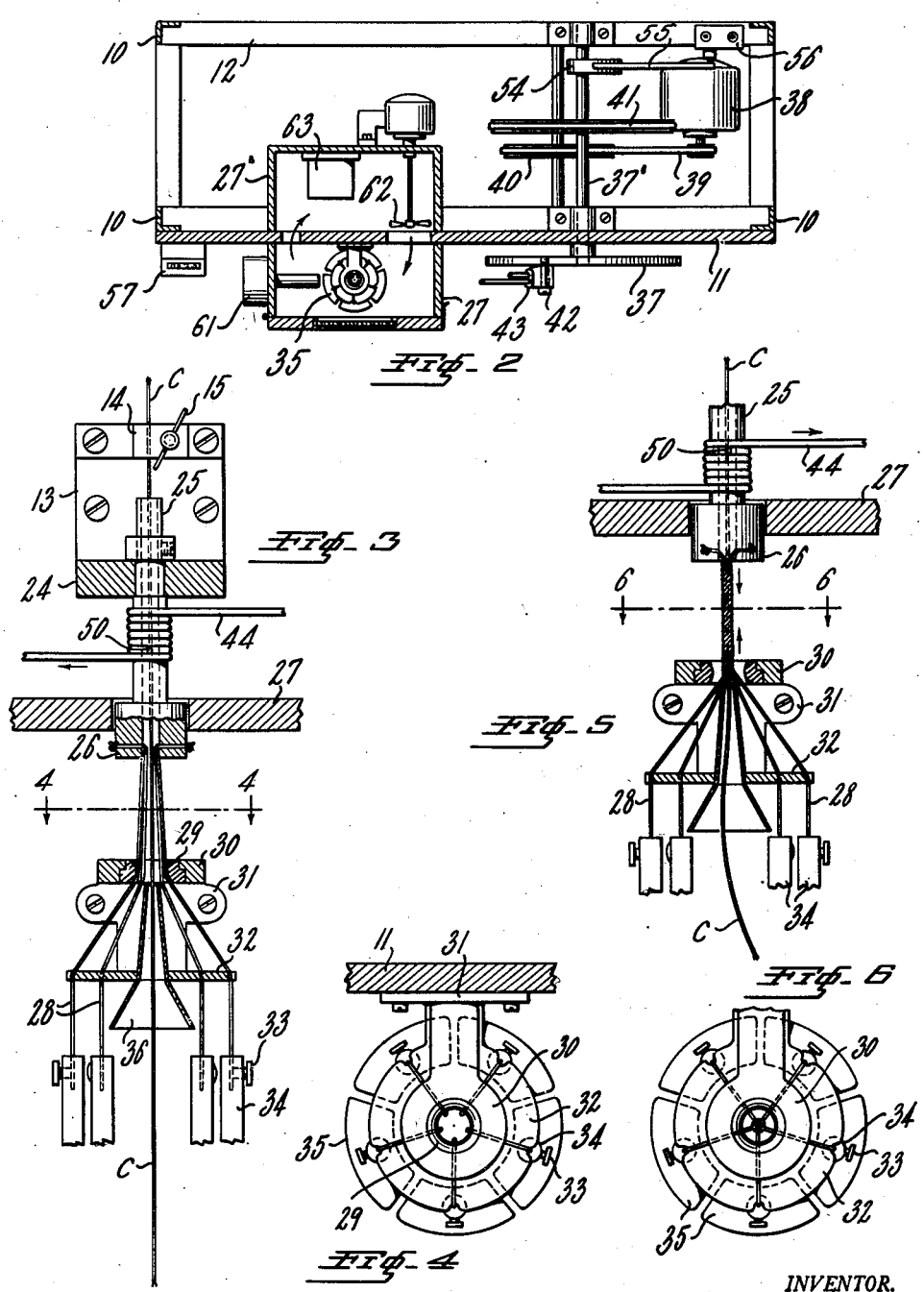
INVENTOR.
THOMAS J. RHODES
BY
Charles C. Wilson
ATTORNEY

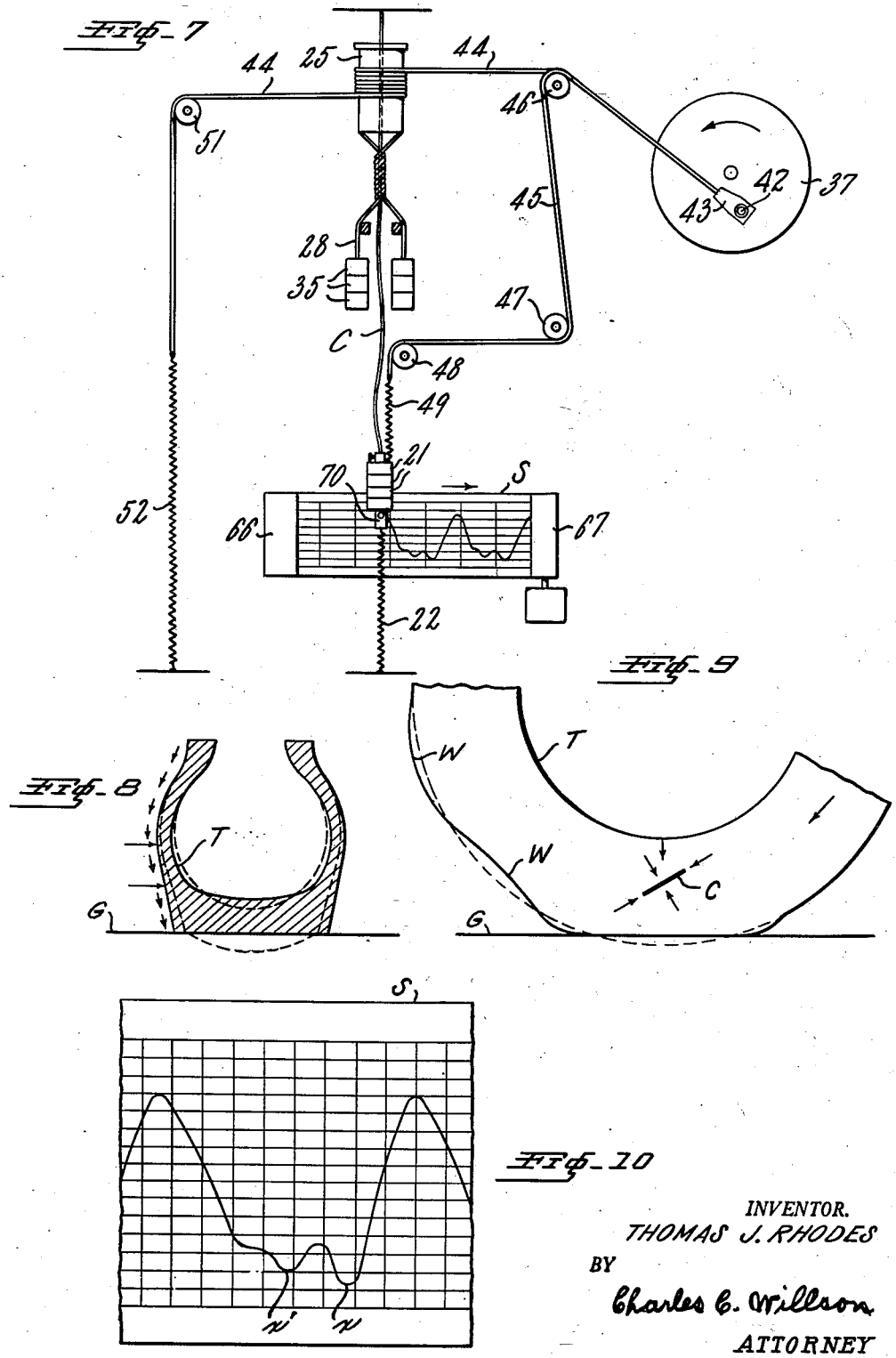

Patented Sept. 30, 1952

2,612,040

UNITED STATES PATENT OFFICE 2,612,040

APPARATUS FOR TESTING CORD FATIGUE

Thomas J. Rhodes, Ramsey, N. J., assignor to United States Rubber Company, New York, N. Y., a corporation of New Jersey Application December 11, 1947, Serial No. 791,050

6 Claims. (Cl. 73—91)

1

This invention relates to novel apparatus for testing the fatigue properties of a cord or strand, and more particularly to the testing of a tire cord under conditions that approximate the forces that act upon the cord under tire running conditions.

It is well known that the portion of a pneumatic tire that is most likely to fail in normal use, unless the tire is pierced by a sharp object, lies in that area where the side walls and tread meet. This is due to the fact that the cords lying in this area are subjected to an axial compressing force and a lateral compressing force each time the tread in this vicinity takes the load of the wheel. This axial compressing force apparently bends the individual fibers, as it is the portion of the cords that are subjected to this axial compression as well as longitudinal tension that undergoes the greatest fatigue.

Stated differently the principal fatigue forces acting on a tire cord in a running tire consist of axial tension, axial compression, and lateral compression, the compression forces being produced by a flattening of the portion of the tire that takes the load.

Attempts have been made heretofore to test tire cords under the several fatiguing forces that act upon such cords in a tire. This has been done by placing the cords to be tested in a body of vulcanized rubber and then flexing the mass to produce the fatiguing forces under which the cords are to be tested. This method of testing cords has the disadvantage of making the results dependent on the characteristics of the rubber. It has the further disadvantage that each fatiguing force cannot be varied individually to study the action of the same on the cord being tested.

The primary object of the present invention is to provide an apparatus for testing a cord, free from a bonding rubber mass and under different fatiguing forces that can be independently changed as desired.

In a pneumatic tire for vehicles the cords forming the tire carcass are subjected to static tension when the tire is inflated but not running, and to dynamic forces when the tire is rolling along a roadway. Under running condition the tire carcass is subjected to reoccurring cycles of different fatiguing forces that occur with each rotation of the tire.

As a selected portion of the tire carcass rolls into position to take the load of the vehicle wheel this portion will be flattened to some extent by its contact with the road. The effect of this is

2 to exert an axial compressing force and a lateral compressing force upon the cords in the adjacent side wall area, and an instant later these cords are subjected to a dynamic longitudinal tension produced as the flattened portion of the tire is pulled up from the road by the wheel to again assume its round position.

The present invention makes it possible to test a tire cord under controlled fatigue producing forces which closely approximate the fatigue producing forces just mentioned that acting upon a tire cord under tire running conditions. Such tests consist in subjecting the cord repeatedly to a dynamic longitudinal tension and then to a combined lateral compressing and axial compressing force, and continuing these fatigue producing forces until the cord parts. The present method and apparatus may be used to test cord formed of cotton, rayon, nylon or other textile materials since each testing force may be adjusted as required for the material being tested. The testing forces are preferably applied to the cord at the approximate speed at which they would occur in a tire on the road.

The above and other features of the present invention will be further understood from the following description when read in connection with the accompanying drawings illustrating one good practical embodiment of the invention, and wherein:

Fig. 2 is a horizontal sectional view taken approximately on the line 2—2 of Fig. 1.

Figure 1:
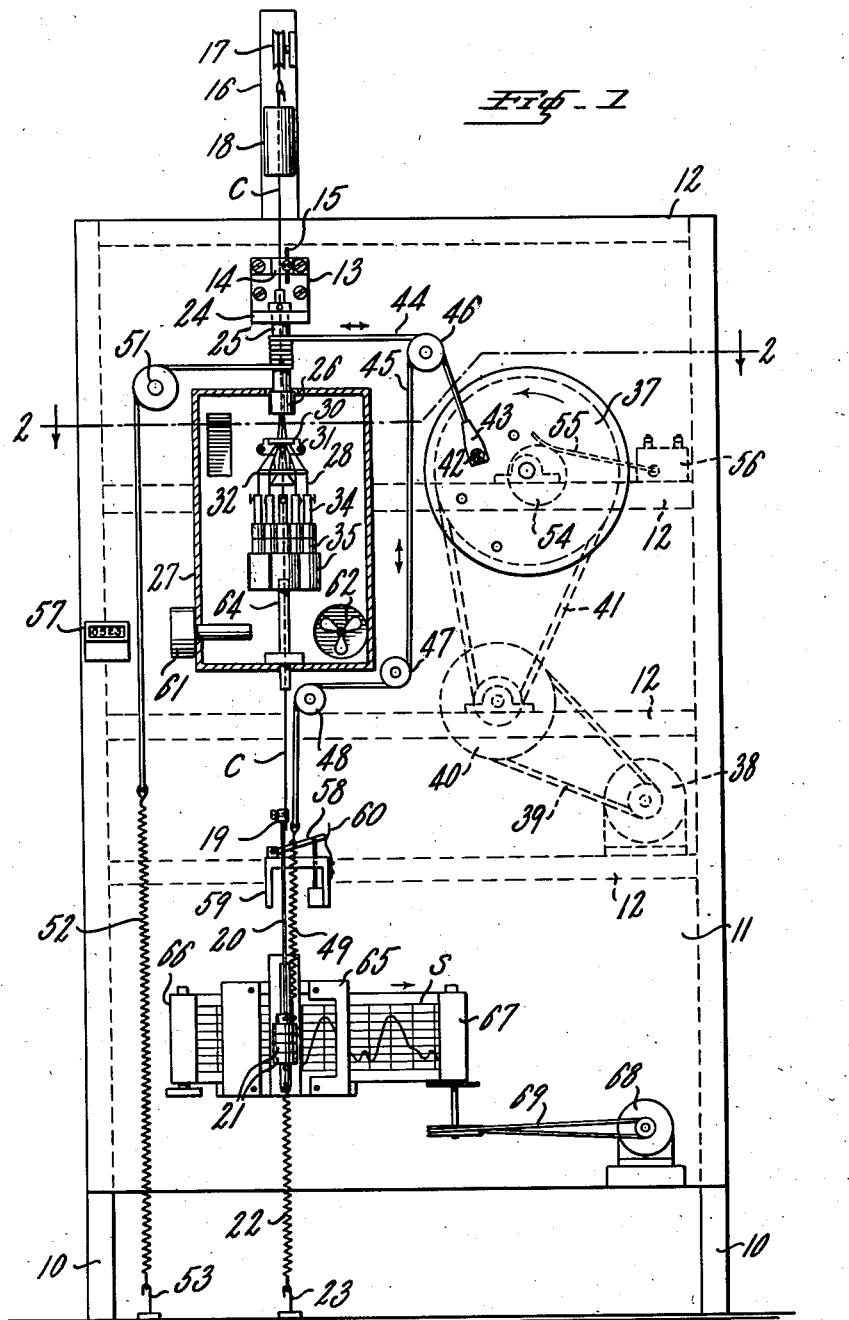
Fig. 1 is a front elevation of the testing machine, the box which houses the portion of the cord under test being shown in section.

Fig. 3 on a larger scale is a vertical sectional view of apparatus including tensioned strands ready to be twisted into tight embracing relation with the tire cord.

Fig. 4 is a sectional view taken on the line 4—4 of Fig. 3.

Fig. 5 is a view similar to Fig. 3 showing the tensioned surrounding strands twisted into tight embracing relation with the tire cord.

Fig. 6 is a sectional view taken on the lines 6—6 of Fig. 5.

Fig. 7 is a more or less schematic view of the essential parts of the testing apparatus shown in Fig. 1.

Fig. 8 is a transverse sectional view of an ordinary pneumatic tire for motor vehicles.

Fig. 9 is a side view of portion of the tire of Fig. 8 showing how the tire is distorted from a true circle where it rests upon the road and at points close to the road; and Fig. 10 is a larger view of the recording sheet having a plotted curve recorded by the testing apparatus of Fig. 1.

The apparatus of the present invention is designed to subject a cord repeatedly to different fatiguing forces and may be variously constructed. As shown in Fig. 1 of the drawing the various parts of the testing apparatus are supported by an upright casing or cabinet having the combined corner posts and legs 10, front wall 11 and traversely extending bars 12.

The cord C to be tested is threaded up through the apparatus which will be described so that it may be suspended in a vertical position from a supporting bracket 13 secured to the front wall of the cabinet and which bracket carries a cord clamp 14 under the control of the wing nut 15. Extending upwardly from the top of the cabinet is an upright post 16 which supports a grooved pulley 17 about which the upper end portion of the cord C extends, and to the end of such cord is attached the weight 18. The purpose of this weight is to subject each cord C to be tested to the same amount of tension in threading up the testing machine.

The lower end of the cord C is firmly secured to a clamp 19 mounted on a rod 20 which carries near its lower end a number of weights 21, the number of these weights may be varied to vary the load upon the cord C. To the lower end of the rod 20 is attached the coiled spring 22 and the lower end of this spring is attached to an anchoring hook 23. The arrangement is such that this spring 22 continuously exerts a yielding downward pull upon the weighted rod 20 so that this rod may bounce under the resilient action of the cord C. The construction is such that the weighted rod 20 is repeatedly raised a short distance, by mechanism to be described, and then dropped to exert upon the cord C a dynamic longitudinal tension, and the amount of resiliency possessed by the cord will be shown by the degree of bounce it imparts to the weighted rod 20 immediately following the tensioning of the cord by the dropping weights.

As above pointed out a tire cord in a running tire is subjected not only to longitudinal tension but also to a lateral and axial compression. Mechanism for subjecting cord to these compressing forces will now be described. To this end in the construction shown the bracket 13 above described is provided with a laterally extending flange 24 in which is rotatably mounted an upright shaft 25. This shaft extends downwardly from the flange 24 and is provided at its lower end with a head 26 that extends into the air conditioning box 27 in which the cord is subjected to a plurality of fatiguing forces. The shaft 25 has a central opening longitudinally therethrough to clear the cord C being tested. A number of strands 28 are suspended from the shaft head 26 about the cord C, five strands being shown in the drawing. Each of these strands extends laterally inwardly through a hole in the head 26 as best shown in Fig. 3 and then downwardly in slightly spaced relation to the cord C, and each of these strands is attached to such head by a knot tied in the strand so that it will rest against the outer surface of the head 26. These strands 28 as shown in Fig. 3 extend downwardly in nearly parallel relation to each other to pass through a guide ring 29 such as a porcelain ring mounted within a support 30 attached to a bracket 31 that is secured to the wall 11. These strands 28 extend from the ring 29 downwardly to the spreader disk 32 having its outer periphery notched to receive and equally space the strands 28. To the lower end of each strand 28 is rigidly secured by means of a clamping bolt 33 a weight supporting bracket 34 adapted to carry a plurality of weights 35. The arrangement is such that the strands 28 surrounding the cord C are maintained under uniformed tension by the weights 35. The spreader 32 is supported by the bracket 31 and this spreader has a central opening in which is mounted a trumpet 36 the upper end of which terminates adjacent the guide ring 29.

The purpose of the apparatus just described is to embrace tightly and contract longitudinally a short length of the cord C to subject the same to a lateral and axial compression, somewhat similar to that to which it is subjected in a tire when it lies at the juncture of the tire tread with a side wall of the tire. These compressive forces are repeatedly imparted to the enclosed length of cord by rotating the head 26 to thereby wind the strands 28 tightly about the cord C as shown in Fig. 5. After these strands 28 have been wound into snug engagement with the cord C, further twisting of these strands will serve to contract the cord they embrace and thereby subject the fibers forming the cord to a bending or buckling action that decreases the life of the cord. The strands 28 should be formed of strong highly flexible material in order to give good service.

During the operation of the testing machine of the present invention the cord is subjected repeatedly to a longitudinal tensioning force by the falling weights 21 and to a lateral and axial compressing force exerted by the strands 28, these forces being exerted successively and not simultaneously. The operating means for subjecting the cord to these forces comprises a power driven disk 37 which is rotatably supported by a shaft 37' mounted in bearings positioned upon two of the transverse bars 12. This disk is driven by an electric motor 38, belt 39, reducing pulleys 40, and second belt 41. The rotating disk 37 is provided with several bolt holes spaced different distances from its central axis as shown in Fig. 1 and adapted to receive a bolt 42. The purpose of these bolt holes is to enable a cord anchoring head 43 to be connected to the disk 37 by the bolt 42 at a desired distance from the disk center, so that as the disk is rotated it will pull and relax the cables 44 and 45 attached to the head 43. These cables pass about a freely rotating pulley 46 and then the cable 45 passes downwardly about the guide pulleys 47 and 48 and its lower end is attached to a coiled spring 49. The lower end of this spring is attached to the weights 21 to raise these weights with a yielding action and then permit them to drop as the disk 37 is rotated. The arrangement is such that the cord C is free of tension while the weights are being raised by the cable 45. It will be noted that these weights are continuously urged downwardly by the coiled spring 22, the purpose of this spring 22 and the spring 49 being to permit the suspended weights 21 to vibrate or bounce in response to the elastic properties of the cord C.

The other cable 44 is provided to rotate the head 26 to wind the strands 28 tightly about the cord C as shown in Fig. 5 and then unwind these strands as shown in Fig. 3 to thereby repeatedly embrace and release the cord C. To this end the cable 44 is wrapped a number of times around the shaft 25 and is anchored thereto at a desired point by a bolt or the like 50. The remaining portion of this cable 44 extends around a free running pulley 51 and is attached to a coiled spring 52 the lower end of which is attached to an anchoring hook 53.

When the cables 44 and 45 are in the position in which they are shown in Fig. 1 the cable 45 will be free from the load exerted by the weights 21 as these weights are supported at this time by the cord C. However it is not the static load of these weights that exert a pronounced fatiguing force upon the cord C but rather the dynamic force exerted upon the cord when these weights drop and immediately thereafter rebound and drop a second time, in a manner that indicates the resiliency of the cord being tested.

When the cables 44 and 45 are in the position in which they are shown in Fig. 1 the strands 28 will be unwrapped from the cord C as best shown in Fig. 3, but as the disk 37 rotates to the position in which it is shown in Fig. 7 to exert a pull upon both cables this will elevate the weights 21 and rotate the head 26 so as to wrap the strands 28 tightly about the cord C as shown in Fig. 5. The effect of this is to slack off the tension of the cord C and to tightly embrace and condense the cord axially as above described. It will therefore be seen that as the disk 37 continues to rotate the cord C will be repeatedly subjected to a dynamic stretching action and then to an axial and lateral compressing action to subject the cord to these different fatiguing forces, and this testing of the cord is preferably continued until the cord breaks.

The number of revolutions made by the disk 37 is conveniently recorded by providing the disk shaft 37' with a small eccentric 54 adapted to actuate a pivoted arm 55 to thereby operate a switch within the box 56 so as to control an electric circuit that operate the counter 57.

Since the recording device 57 is operated from the rotating disk shaft 37' it is important to stop the machine as soon as the cord C breaks. This is accomplished in the construction shown by providing a lever 58 pivoted upon the casing 59 that contains an electric switch. The lever 58 is normally held elevated as shown in Fig. 1 by a blade spring 60. The arrangement is such that when the cord C breaks the clamp 19 will move downwardly and depress the lever 58 to cut off the power to the electric motor 38.

It is desirable to control the temperature and humidity within the box 27 throughout the cord testing operation, and to this end the box is provided with a thermostat 61 and also with a small fan 62 mounted in the rear box 27' to force air into the front box and then out to the rear box through the openings shown. The rear box contains the heater 63. The cord C, as above stated, extends from the clamping device 14 above the air conditioned box 27 downwardly to the clamping means 19 disposed below this box. The cord leaves the box through the tube 64. However only that portion of the cord C which is positioned in the upper portion of the box 27 is subjected to the combined fatiguing forces. During a test the door of the box shown in Fig. 2 should be closed.

It is highly desirable to study the bouncing action of the weight rod 20 at intervals during the cord testing operation as this gives an indication of the elastic properties of the cord and how these properties vary from time to time during the testing. To this end in the construction shown mechanism is provided for advancing a recording sheet of paper past the weights 21. This recording mechanism comprises a paper guiding frame 65 having supported at one end thereof the paper let off roll 66 and at the other end thereof the paper take-up roll 67 which may be rotated by the electric motor 68 and belt 69. The weight supporting rod 20 has associated with its lower end, as best shown in Fig. 7, a marking pen 70. The arrangement is such that when the motor 68 is operated, during the operation of the testing machine, so as to advance the recording sheet S, the rising and falling movement of the weight rod 20 will draw a curve on the sheet S substantially as shown in Figs. 1 and 10. The height of the curve is not particularly important since this merely indicates the height to which the weight rod is lifted by the cable 45, but the important part of this curve is the lower portion thereof lying between the points $x$ and $x'$, see Fig. 10. A study of the position marked $x$ on the chart when readings are taken from time to time throughout the cord testing operation will indicate the cord growth or elongation from the start to the time the cord breaks, and the portion of the curve lying between the point $x$ and $x'$ indicates the resiliency or elasticity of the cord. Knowing the mass of the moving weights 21 and of the spring 22 it is possible to calculate, by means of this chart, the maximum stress exerted on the cord.

Fig. 8 of the drawing shows in full lines a cross sectional view through a pneumatic tire T as the same appears where it rests on the ground G, and the dotted lines in this view show the shape of the tire as it appears when it is out of engagement with the ground. It is found as above stated that a tire carcass is subjected to the greatest fatiguing forces in the area where the tread meets the side walls. This area lies between the two horizontal arrows in Fig. 8, and in this area the cord is subjected to lateral and axial compression, and to a quick strong longitudinal tension as the tire returns to the dotted line position of this view. The row of arrows in Fig. 8 show the downward direction in which the wheel load acts through the confined air and through the side walls of the tire.

Fig. 9 is a side view of the portions of the tire of Fig. 8 lying near the ground G, the tread being shown in dotted lines in this figure as not distorted, and in full lines as flattened out by the ground pressure and as distorted from a true circle in front of and at the rear of the flattened portion of the tire. A cord C is indicated in Fig. 9 as lying diagonally in the tire carcass directly above the portion of the tire which is flattened by its engagement with the ground. This is the area where these cords are subjected to both lateral and axial compression, due to the vertical downward force through the tire walls. This force is resolved into the component forces acting on the cord axially and at right angles to the cord as indicated by the arrows.

As the tire rotates in the direction indicated by the arrow in Fig. 9 along a road, the portion of the tire tread that is pulled away from the road by the wheel travel will be subjected to the peculiar wave movement indicated by W. This wave movement, which may be exaggerated somewhat by the showing of Fig. 9, subjects the tire cord to quick and severe longitudinal tension.

The cord testing mechanism of the present invention through the falling weights 21 subjects the cord to fatiguing forces resembling those produced in the area marked W in Fig. 9, and the embracing strands 28 subject the cord to fatiguing forces resembling those produced in the area marked T in Fig. 8.

A highly desirable feature of the present invention resides in the fact that an individual tire cord can be subjected to an axial tension, an axial compression, and a lateral compression, without the necessity of embedding the cord in a mass of vulcanized rubber, and also in the construction whereby the longitudinal tensioning force on the cord may be varied as desired independently of the cord compressing forces. This can be accomplished by varying the number of weights 21 provided upon the weight rod 20, and by varying the number of weights 35 carried by the weight support 34. Another highly desirable feature of the present invention resides in means for producing a dynamic force through the falling weights 21 that act upon the cord so that it can stretch and contract, as the weights rebound, in a damped harmonic cycle.

Having thus described my invention, what I claim and desire to protect by Letters Patent is:

1. A cord fatigue testing machine comprising, cord supporting means, mechanism for periodically subjecting the cord to a dynamic longitudinal tension, a plurality of longitudinally tensioned strands disposed about the cord, means for twisting these strands about the cord into and out of tight embracing relation therewith to periodically compress the cord laterally and axially, and power means for actuating said mechanism and said twisting means in rapidly reoccurring cycles.

2. A cord fatigue testing machine comprising, cord supporting means, mechanism for periodically subjecting the cord to a dynamic longitudinal tension, a plurality of longitudinally tensioned strands disposed about the cord, means for twisting these strands about the cord into and out of tight embracing relation therewith to periodically compress the cord laterally and axially while it is free from said longitudinal tension, and power means for actuating said mechanism and said twisting means in rapidly reoccurring cycles.

3. A cord fatigue testing machine comprising, cord supporting means, mechanism for periodically subjecting the cord to a dynamic longitudinal tension, a plurality of longitudinally tensioned strands disposed about the cord, means for twisting these strands about the cord into and out of tight embracing relation therewith to periodically compress the cord laterally and axially, power means for actuating said mechanism and said twisting means in rapidly reoccurring cycles, and means for tracing on a moving surface a curve produced by the cord's action under the testing conditions.

4. A cord fatigue testing machine comprising, cord supporting means, mechanism for periodically subjecting the cord to a dynamic longitudinal tension, a plurality of longitudinally tensioned strands disposed about the cord, means for twisting these strands about the cord into and out of embracing relation with the cord to periodically compress the cord laterally and axially, power means for actuating said mechanism and said twisting means in rapidly reoccurring cycles, and an air conditioned chamber surrounding the portion of the cord being tested.

5. A cord fatigue testing machine comprising, cord supporting means, mechanism for periodically subjecting the cord to a dynamic longitudinal tension, a plurality of longitudinally tensioned strands disposed about the cord, means for twisting these strands about the cord into and out of embracing relation with the cord to periodically compress the cord laterally and axially, power means for actuating said mechanism and said twisting means in rapidly reoccurring cycles, and means whereby the longitudinal tensioning force and axial compressing force may be independently varied.

6. A cord fatigue testing machine comprising, means for supporting a cord in a suspended condition, mechanism for subjecting the cord repeatedly to a dynamic stretching force including a weight and a weight suspending spring operable to raise the weight so as to relieve the cord from longitudinal strain and then drop the weight so that its fall will be arrested by its longitudinal pull upon the cord, and means for automatically recording the movement of the weight.

THOMAS J. RHODES.

REFERENCES CITED

The following references are of record in the file of this patent:

UNITED STATES PATENTS

| Number | Name | Date |
|---|---|---|
| 1,156,726 | Upton et al. | Oct. 12, 1915 |
| 1,499,546 | Oxley | July 1, 1924 |
| 1,635,787 | Hort | July 12, 1927 |
| 1,739,298 | Ford | Dec. 10, 1929 |
| 1,885,209 | Koester | Nov. 1, 1932 |
| 1,960,675 | Koester | May 29, 1934 |
| 2,157,092 | Allen et al. | May 9, 1939 |
| 2,265,142 | Burke et al. | Dec. 9, 1941 |

FOREIGN PATENTS

| Number | Country | Date |
|---|---|---|
| 411,124 | Germany | Mar. 16, 1925 |